United States Patent [19]
Genin et al.

[11] Patent Number: 5,605,342
[45] Date of Patent: Feb. 25, 1997

[54] GASKETS

[75] Inventors: Bernard C. D. Genin, Venissieux, France; Christopher R. Harland, Oxon, England

[73] Assignees: T&N plc, Manchester, England; Curty Payen SA, Saint Priest, France

[21] Appl. No.: 513,943

[22] PCT Filed: Mar. 10, 1994

[86] PCT No.: PCT/GB94/00474

§ 371 Date: Sep. 13, 1995

§ 102(e) Date: Sep. 13, 1995

[87] PCT Pub. No.: WO94/20745

PCT Pub. Date: Sep. 15, 1994

[30] Foreign Application Priority Data

Mar. 10, 1993 [GB] United Kingdom ............... 9303255

[51] Int. Cl.$^6$ ............................................. F16J 15/08
[52] U.S. Cl. ........................... 277/235 B; 277/211
[58] Field of Search ................ 277/235 B, 207 R, 277/211, 213, 235 R, 236

[56] References Cited

U.S. PATENT DOCUMENTS

| 4,739,999 | 4/1980 | Ishii et al. . | |
| 4,759,585 | 7/1988 | Udagawa | 277/235 B |
| 4,767,124 | 8/1988 | Udagawa | 277/235 B |
| 4,834,399 | 5/1989 | Udagawa et al. | 277/235 B |
| 4,867,462 | 9/1989 | Udagawa | 277/235 B |
| 5,092,613 | 3/1992 | Udagawa . | |
| 5,161,809 | 11/1992 | Matsushita et al. | 277/235 B |
| 5,395,127 | 3/1995 | Miyaoh | 277/235 B |

FOREIGN PATENT DOCUMENTS

| 044247A1 | 8/1991 | European Pat. Off. . |
| 1050620 | 7/1956 | Germany . |
| 1549200 | 7/1979 | United Kingdom . |
| 2221731A | 2/1990 | United Kingdom . |

*Primary Examiner*—Daniel G. DePumpo
*Attorney, Agent, or Firm*—Nixon & Vanderhye P.C.

[57] ABSTRACT

A cylinder head gasket eyelet for an aperture is provided with an annular conjugation which when the eyelet is in place in the aperture is aligned with an annular corrugation in the core sheet, the respective corrugations being oppositely directed so as to define an annular space therebetween.

5 Claims, 1 Drawing Sheet

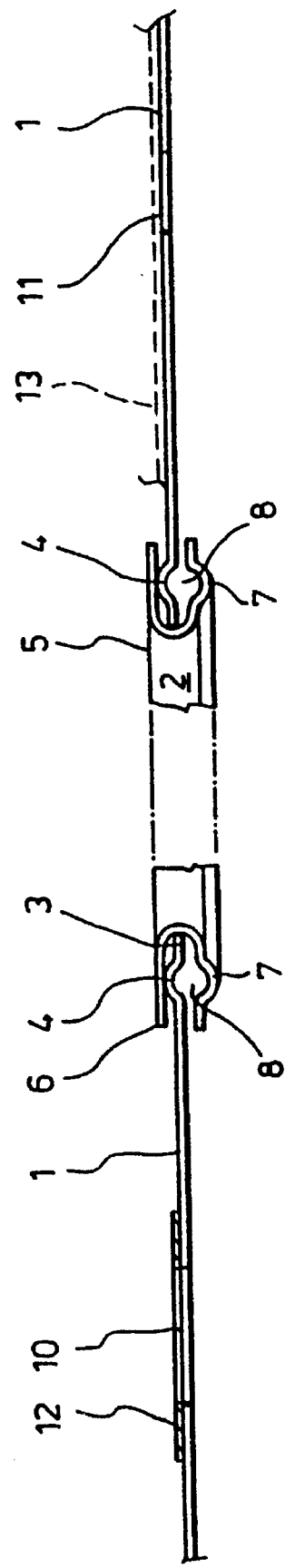
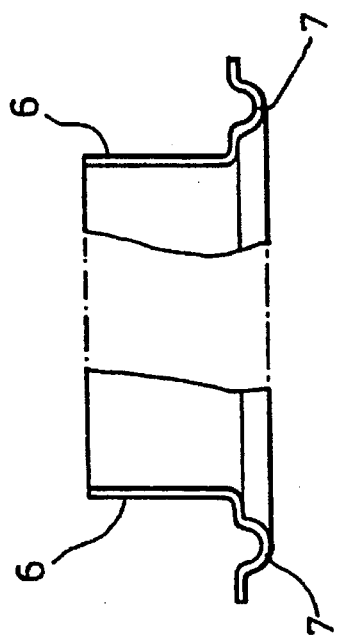

5,605,342

GASKETS

BACKGROUND

This invention relates to cylinder head gaskets for internal combustion engines. In particular it is concerned with metal-elastomer gaskets of the kind wherein a metal core sheet is provided with a plurality of apertures corresponding to engine cylinder bores, oil and/or water passageways and the like, the margins of these apertures being provided with individual sealing elements in the form of metal eyelets and elastomer seals.

The elastomer seals used in this type of product usually take the form of edge or surface moulded elastomer material. The use of an elastomer or other coating on a steel core sheet is also known. In order to achieve satisfactory sealing using elastomer coatings or elastomer beads it is desirable to compress the elastomer coating or bead so as to achieve a total height reduction of from 20–30%. But at the same time it is necessary to seal around combustion chamber apertures where elastomer seals are unsatisfactory, due to the temperatures and pressures to which combustion chamber seals are subjected in use.

One solution to the cylinder bore sealing problem is the use of metal eyelets inserted into the cylinder bore apertures. These function also as compression limiting stops facilitating control over the compressive forces applied to any elastomer seals on the gasket, but the use of eyelets in this way can lead to various kinds of structural distortion in the engine, due to inadequate gasket conformability. Another proposal is the use of at least one annular corrugation surrounding each of those gasket apertures where no elastomer seal is desired. Alternatively wire rings may be used. The use of corrugations and wire rings is commonly combined with the use of eyelets, the latter enclosing the corrugation or wire ring, the purpose of which is to impart a degree of resilience to the metal-to-metal interface.

More recently it has been proposed to construct gaskets with a metal core sheet which is actually made up from a plurality of relatively thin metal sheets; typically three layers are used, but up to five or more layers may be used. The individual sheets may be coated to enhance sealing performance; gas sealing around cylinder bore apertures is accomplished by embossing into at least one of the sheets a corrugation which on compression between a cylinder head and block is progressively and to some extent resiliently flattened between the latter parts to develop a sealing pressure around the aperture in question.

The use of a corrugation as a cylinder bore seal is well-known, particularly with the use of a metal eyelet which overlaps and encloses the corrugation. In heavy duty applications, such as diesel engines, it may be necessary to use a relatively thick metal core which requires considerable force to be used to compress the corrugation, far more than is needed to develop a satisfactory seal at other apertures where elastomer beads constitute the sealing means. An object of the present invention is to provide an improved eyelet for use in a gasket of this kind. It is a further object of the invention to provide a gasket embodying this improved eyelet.

SUMMARY OF THE INVENTION

According to the present invention, a cylinder head gasket for an internal combustion engine comprises at least one metal core sheet having a plurality of apertures defined therein including at least one cylinder bore aperture, wherein the margin of said cylinder bore aperture is provided with an annular corrugation extending around the margin thereof, together with a metal eyelet adapted to overlie said corrugation on both faces of said core sheet, characterised in that said eyelet is provided with an annular corrugation which when the eyelet is in place in the aperture is aligned with an annular corrugation in the core sheet, the respective corrugations being oppositely directed so as to define an annular space therebetween. It is preferred that the metal used for the gasket core should be resilient; a particularly suitable core material is stainless steel, preferably of a fully hard grade such as SAE 301. The metal used for the eyelet is preferably softer than that used for the core, so that the eyelet, including the corrugation, will provide good conformability in use, whilst the core provides good resilience imparting at least some elastic recovery to the combination.

It has been found that an eyelet plus core construction according to this invention has significant advantages over prior art constructions where plain eyelets or conventional corrugations are used. Contrary to gaskets with plain eyelets and/or gaskets incorporating fibre reinforced elastomeric materials, gaskets according to this invention have both the ability to conform and to exhibit improved elastic recovery.

The present invention is preferably applied in conjunction with conventional elastomeric seals. The latter may take the form of an overall coating of an elastomer composition; they may also be used selectively at specific locations, such as the margins of some or all of those apertures which are not fitted with eyelets.

In order that the invention be better understood, a preferred embodiment of it will now be described by way of example with reference to the accompanying drawings.

BRIEF DESCRIPTION OF THE DRAWINGS

FIG. 1 is a cross-sectional side view of part only of a cylinder head gasket for an internal combustion engine, and FIG. 2 is a cross-sectional side view of an eyelet prior to installation.

DETAILED DESCRIPTION OF THE DRAWINGS

In the Figures, a metal core sheet 1 contains several apertures corresponding to the cylinder bores of the engine, one only of these being shown at 2. The margin 3 of this aperture is bounded by a relatively shallow annular corrugation 4 which is pressed into the core either as a part of the step of blanking out the aperture 2, or as a separate process, together with other apertures such as 10, 11 which are required to produce a complete gasket.

The aperture is fitted with an eyelet 5. The latter is shown in FIG. 1 in an uncompressed state, prior to installation in an engine, but after pressing the eyelet into place. The eyelet extends as shown, overlapping the corrugation 4 on both faces of the core 1. The upper overlap 6, lies flat, on top of the corrugation 4. The lower overlap incorporates an annular corrugation 7 which is oppositely directed with respect to the corrugation 4, the two corrugations being aligned with one another so as to define between them an annular space 8. In this case the eyelet 5 was made by forming the corrugation 7 in a flat metal annulus, the inner portion of which was thereafter upset to form an L-section ring ready for insertion into the aperture 2, as shown in FIG. 1(b). After insertion, the portion 6 was turned over, to the position shown in FIG. 1, thereby retaining the eyelet in place. In this particular example, a fully hard stainless steel (SAE 301)

sheet was used for the core sheet 1, whilst the eyelet 5 was made from a softer material, in this instance, SAE 304 grade.

The thus eyeletted gasket was subsequently provided with elastomer seals around non-eyeletted apertures 10, 11, using conventional technology. One such seal is shown at 12 in FIG. 1 in surrounding relationship with aperture 10, while an alternative elastomeric coating is shown in phantom at 13 on the upper surface of core sheet 1 and surrounding the aperture 11. The end product exhibited superior performance in an engine, particularly as regards combustion chamber sealing where the core/eyelet arrangement of this invention conferred significantly improved resilience allied to conformability.

We claim:

1. A cylinder head gasket for an internal combustion engine comprising at least one metal core sheet having a plurality of apertures defined therein including at least one cylinder bore aperture, wherein the margin of said cylinder bore aperture is provided with an annular upwardly convex corrugation extending around the margin thereof, together with a metal eyelet having upper and lower portions adapted to overlie said corrugation on upper and lower faces, respectively, of said core sheet, said eyelet being provided with an annular upwardly concave corrugation in its lower portion which, when the eyelet is in place in the aperture, is aligned with the annular upwardly convex corrugation in the core sheet, the respective corrugations defining an annular space therebetween.

2. A cylinder head gasket according to claim 1 wherein said core sheet is of a material which is harder than that used for the eyelet.

3. A cylinder head gasket according to claim 1 wherein the core sheet and eyelet are of stainless steel.

4. A cylinder head gasket according to claim 1 wherein each cylinder bore aperture is fitted with a metal eyelet and at least one other aperture in the gasket is provided with an elastomeric seal around its margins.

5. A cylinder head gasket according to claim 1 wherein the core sheet is coated on at least one face thereof with an elastomer layer operable in use to seal the margins of those gasket apertures not fitted with eyelets.

* * * * *